Aug. 19, 1947.　　　T. W. POSEY　　　2,426,120
NUT CRACKER
Filed Sept. 29, 1945　　　2 Sheets-Sheet 1

Inventor
Thomas Wynn Posey

By Clarence A. O'Brien
and Harvey B. Jacobson
Attorney

Aug. 19, 1947.　　　T. W. POSEY　　　2,426,120
NUT CRACKER
Filed Sept. 29, 1945　　　2 Sheets-Sheet 2
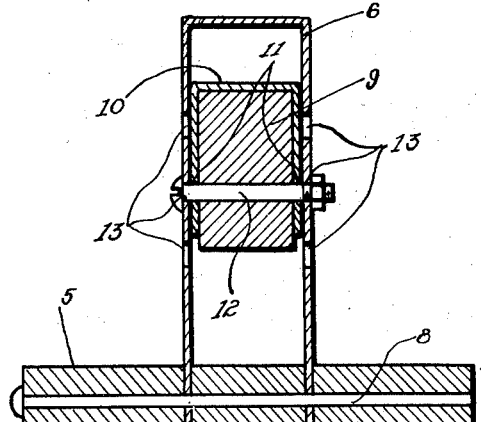
Fig. 5.
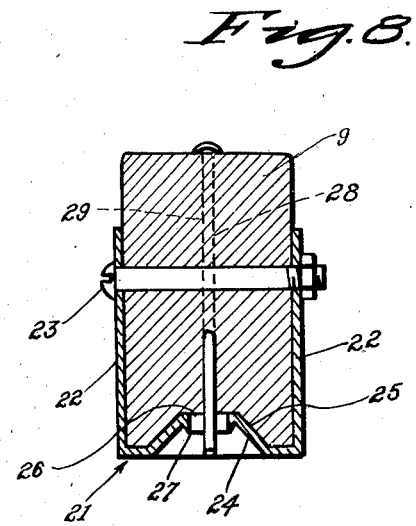
Fig. 8.
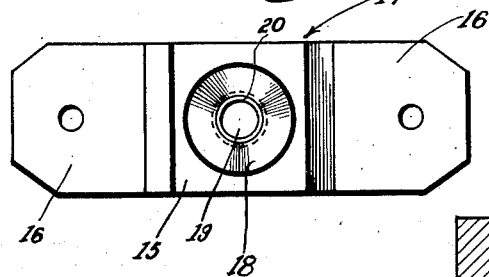
Fig. 6.
Fig. 9.
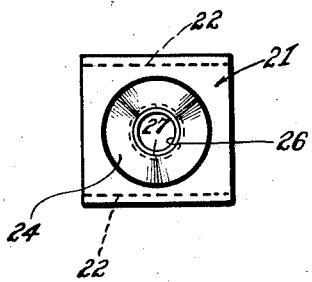
Fig. 7.
Inventor
Thomas Wynn Posey
By Clarence A. O'Brien
and Harvey B. Jackson
Attorney Patented Aug. 19, 1947

2,426,120

UNITED STATES PATENT OFFICE 2,426,120

NUT CRACKER

Thomas Wynn Posey, Brownwood, Tex.

Application September 29, 1945, Serial No. 619,323

2 Claims. (Cl. 146—16)

This invention relates to devices particularly designed for crushing or cracking nuts, and an object of the invention is to provide a convenient and handy device for cracking different types of nuts.

In addition to the above the nut-cracker of the present invention embodies certain new and useful improvements over nut-crackers now generally known and used.

The invention together with its objects and advantages will be best understood from a study of the following description taken in connection with the accompanying drawings wherein:

Figure 5 is a vertical sectional view taken substantially on the line 5—5 of Figure 1.

Figure 6 is a top plan view of the stationary jaw.

Figure 7 is a plan view of the movable jaw.

Figure 8 is a sectional view taken substantially on the line 8—8 of Figure 1.

Figure 9 is a sectional view taken substantially on the line 9—9 of Figure 1.

Figure 1:
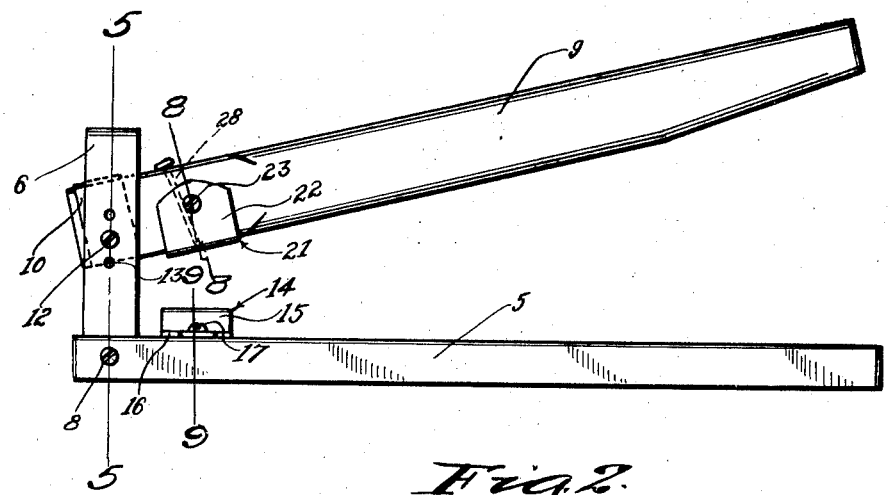
Figure 1 is a side elevational view of a nut-cracker embodying the features of the present invention.
Figure 2:
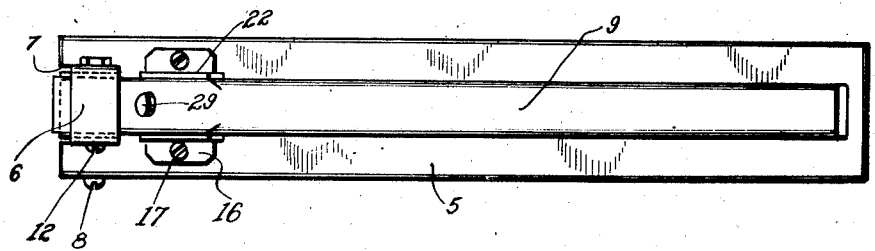
Figure 2 is a top plan view thereof.
Figure 3:
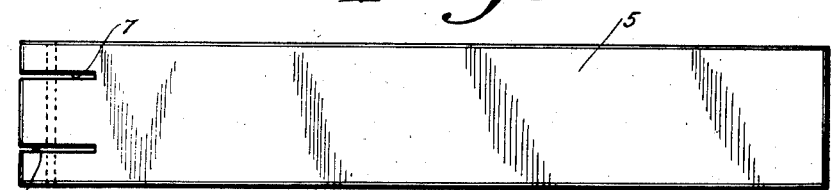
Figure 3 is a plan view of the base forming part of the invention.
Figure 4:
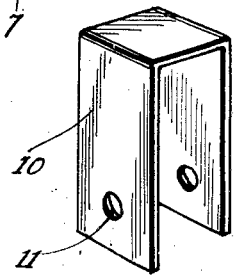
Figure 4 is a perspective view of a reinforcement member for the pivoted lever forming part of the nut-cracker.

Referring more in detail to the drawings it will be seen that in the preferred embodiment thereof the nut-cracker comprises an oblong base 5 formed of wood or other suitable material.

Rising from the base 5 adjacent one end thereof is an inverted U-shaped standard 6, the same being preferably formed of 16-gauge pressed steel.

The legs of the standard 6 at the bottom or open end of the standard are accommodated in slots 7 provided therefor in one end of the base 5, and said legs at said end are positively secured to the base 5 through the medium of a bolt 8 as shown.

Further in accordance with the present invention there is provided a hand lever 9 that at one end is straddled by a substantially U-shaped reinforcing member 10 also of pressed steel.

The legs of the reinforcing member 10 are provided with openings 11 that align with a through opening in the said end of the handle 9, and at said reinforced end the lever 9 has an adjustable pivotal connection with the standard 6 through the medium of a pivot bolt 12 and a series of vertically spaced openings 13 provided in the legs of the standard 6; the reinforced end of the lever 9 being accommodated between the legs of the standard as shown.

Also mounted on the base 5 adjacent the standard 6 is a stationary jaw 14.

The jaw 14 is formed from a suitable length of 16-gauge pressed steel shaped to provide a raised center portion 15 and outwardly extending base or attaching flanges 16.

The jaw 14 is secured to the base 5 through the medium of the flanges 16 and screws or other suitable fastening elements 17 as best shown in Figure 9.

The raised portion 15 of the jaw is provided with a nut-accommodating recess 18 and in the bottom of the recess 18 there is provided an opening 19 that is formed by punching the hole from the underside of the jaw so that there is provided in the bottom of the recess 18 and circumjacent the hole 19 a rough upstanding edge 20 that serves as a cutting edge.

On the underside of the lever 9 adjacent the pivoted end of the lever there is provided a complemental, and what may be termed a movable jaw 21.

The jaw 21 is formed from a length of pressed steel and has the end portions thereof bent in parallelism to provide a pair of attaching flanges 22 through the medium of which and a bolt 23 the jaw 21 is secured in a straddling position on the lever 9.

The body of the jaw 21 has a nut-accommodating recess 24 pressed therefrom and to accommodate this recess-forming formation the underside of the lever 9 is complementarily formed as at 25 and as shown in Figure 8.

Also at the inner end thereof the jaw recess 24 is provided with an axial or center opening 26 that is formed substantially in the same manner as the opening 19 is formed in the jaw 14, and to provide a cutting edge 27 extending inwardly of the recess 24 as also shown in Figure 8.

The manner of using and the operation of the device are believed to be apparent, but may be briefly described as follows: With the parts substantially in the position shown in Figure 1, the nut is placed in position with one end of the nut seating in the recess 18 and the opposite end of the nut seating in the recess 24. The operator then presses down on the lever 9 causing the same to swing on its pivot 12 thus crushing the shell of the nut; this crushing action being facilitated by the cutting action of the edges 20 and 27 respectively.

Also in accordance with the present invention the handle or lever 9 at the jaw-equipped end thereof is provided with a diagonal through opening 28 which slidably accommodates a headed plunger 29. Normally the plunger 29 is in a retracted postion, that is to say, in a position with the head end thereof projected upwardly beyond the top surface of the lever 9. Thus it will be seen that after the cracking of the nut and the lever 9 is swung upwardly the projecting headed end of the plunger 29 will come into contact with the upper end of the standard 6. This will cause the plunger 29 to move through the opening 28 and the opening 26 with which the opening 28 is aligned so that an end of the plunger 29 will pass through the opening 26 into the recess 24 of jaw 21. This inward movement of the plunger 29 will result in the forcing from the recess 24 any portions of the shell that might tend to accumulate in said recess.

When the next nut is to be crack the plunger 29 is pulled out to the retracted position hereinabove first referred to.

It will also be apparent that the lever 9 may be pivotally connected to the standard 6 at any one of several points of adjustment so that the device will be made to readily accommodate a nut of any size within reason.

It is thought that a clear understanding of the construction, manner of operation, utility and advantages of a nut-cracker embodying the features of the present invention will be had without a more detailed description thereof.

It is also to be understood that while I have herein shown and described a preferred embodiment of the invention, it is in no wise intended to restrict the invention to the precise details of construction, combination and arrangement of elements as herein illustrated, other than as may be required by the prior art and scope of the appended claims.

Having thus described the invention what is claimed as new is:

1. In a nut-cracker of the character described, an oblong base, a standard rising from the base adjacent one end thereof, a lever having an adjustable pivotal connection at one end thereof with said standard, a stationary jaw mounted on said base adjacent said standard, said stationary jaw embodying a raised portion having a nut-accommodating recess therein and a through opening axially of said recess with an upstanding flange surrounding the opening and serving as a cutting-edge, and a jaw member fixed on said lever adjacent the pivoted end of the latter, said last-named jaw member having a nut-accommodating recess and an opening at the inner end of said recess, together with a flange surrounding said opening and extending inwardly of said recess and presenting a cutting-edge; and means for clearing the last named jaw of any shell accummulations therein operative by engagement with said standard during upward swinging of said lever and including a member for entering the recess of the last named jaw by way of the opening at the inner end of said recess.

2. In a nut-cracker of the character described, an oblong base, a standard rising from the base adjacent one end thereof, a lever having an adjustable pivotal connection at one end thereof with said standard, a stationary jaw mounted on said base adjacent said standard, said stationary jaw embodying a raised portion having a nut-accommodating recess therein and a through opening axially of said recess with an upstanding flange surrounding the opening and serving as a cutting edge, and a jaw member fixed on said lever adjacent the pivoted end of the latter, said last-named jaw member having a nut-accommodating recess and an opening at the inner end of said recess, together with a flange surrounding said opening and extending inwardly of said recess and presenting a cutting-edge; said lever having a diagonal through opening substantially aligning with the opening in the jaw carried by said lever, and a plunger member having a sliding fit in the opening in said lever; said plunger member normally being in a position to have one end thereof engaged with said standard upon upward swinging movement of the lever whereby to cause said plunger to move inwardly of the recess in the jaw carried by the lever for clearing said recess of any shell accumulation.

THOMAS WYNN POSEY.

REFERENCES CITED

The following references are of record in the file of this patent:

UNITED STATES PATENTS

| Number | Name | Date |
|---|---|---|
| 1,129,213 | McEwan | Feb. 23, 1915 |
| 622,262 | Prade | Apr. 4, 1899 |
| 1,555,518 | Ramey | Sept. 29, 1925 |
| 2,085,262 | La Ferney | June 29, 1937 |